(12) United States Patent
Hu et al.

(10) Patent No.: US 9,769,903 B2
(45) Date of Patent: Sep. 19, 2017

(54) LIGHTING CONTROL SYSTEM USING ZIGBEE COMMUNICATIONS PROTOCOL

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventors: Nianfa Hu, Beijing (CN); Qingyang Zhao, Beijing (CN); Wei Xie, Beijing (CN); Hui Shen, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 70 days.

(21) Appl. No.: 14/433,977

(22) PCT Filed: Aug. 21, 2014

(86) PCT No.: PCT/CN2014/084933
§ 371 (c)(1),
(2) Date: Apr. 7, 2015

(87) PCT Pub. No.: WO2015/135294
PCT Pub. Date: Sep. 17, 2015

(65) Prior Publication Data
US 2016/0262242 A1 Sep. 8, 2016

(30) Foreign Application Priority Data
Mar. 13, 2014 (CN) .......................... 2014 1 0093874

(51) Int. Cl.
*H05B 37/02* (2006.01)
*H05B 33/08* (2006.01)

(52) U.S. Cl.
CPC ...... *H05B 37/0218* (2013.01); *H05B 33/0845* (2013.01); *H05B 33/0857* (2013.01); *H05B 37/0272* (2013.01)

(58) Field of Classification Search
CPC ........................ H05B 37/0254; H05B 37/0272
(Continued)

(56) References Cited

U.S. PATENT DOCUMENTS 8,033,686 B2 * 10/2011 Recker ............... H05B 33/0803
362/249.02
2011/0140611 A1 * 6/2011 Elek ................... H05B 37/0272
315/130
(Continued)

FOREIGN PATENT DOCUMENTS

CN 101163365 A 4/2008
CN 101175005 A 5/2008
(Continued)

OTHER PUBLICATIONS

International Search Report Appln. No. PCT/CN2014/084933; Dated Dec. 5, 2014.
(Continued)

*Primary Examiner* — Thuy Vinh Tran
(74) *Attorney, Agent, or Firm* — Ladas & Parry LLP

(57) ABSTRACT

A lighting control system comprises a router installed with a Zigbee gateway, and at least one set of lighting devices; the lighting device includes a Zigbee control module, a power supply module and a lamp; the Zigbee gateway converts a wireless signal received by the router for controlling the operation of the lamp into a digital signal of the Zigbee protocol and transmits the digital signal to the Zigbee control module; and the Zigbee control module converts the digital signal into a control signal required to adjust the lamp, and the control signal controls an electric signal output
(Continued)

to the lamp by the power supply module to control the operation of the lamp. Using Zigbee signals to build a lighting control system facilitates ad hoc networking and can realize multi-point control of lamps.

10 Claims, 3 Drawing Sheets

(58) Field of Classification Search
USPC .................................................. 315/294, 308
See application file for complete search history.

(56) References Cited

U.S. PATENT DOCUMENTS

| | | |
|---|---|---|
| 2013/0169407 A1 | 7/2013 | Chen et al. |
| 2013/0201316 A1* | 8/2013 | Binder .................... H04L 67/12 348/77 |

FOREIGN PATENT DOCUMENTS

| | | |
|---|---|---|
| CN | 201341258 Y | 11/2009 |
| CN | 201766739 U | 3/2011 |
| CN | 102336347 A | 7/2013 |
| CN | 103607800 A | 2/2014 |
| CN | 103889115 A | 6/2014 |
| CN | 203748080 U | 7/2014 |

OTHER PUBLICATIONS

Written Opinion of the International Searching Authority Appln. No. PCT/CN2014/084933; Dated Dec. 5, 2014.
First Chinese Office Action Appln. No. 201410093874.6; Dated May 21, 2015.
Second Chinese Office Action Appln. No. 201410093874.6; Dated Jul. 15, 2015.
Chinese Rejection Rejection Decision Appln. No. 201410093874.6: Dated Dec. 4, 2015.

* cited by examiner

LIGHTING CONTROL SYSTEM USING ZIGBEE COMMUNICATIONS PROTOCOL

TECHNICAL FIELD OF THE DISCLOSURE

The present disclosure relates to a lighting control system.

BACKGROUND

With further development of the Internet of Things, intelligentizing of household appliances is improving gradually. The LED (Light Emitting Diode) lighting luminaire as a low power cost and environmentally friendly new luminaire is taking the place of the incandescent lamp gradually to become a new generation of energy-saving luminaire that is most widely used.

SUMMARY

At least one embodiment of the present disclosure provides a lighting control system to realize networking control of lighting devices.

At least one embodiment of the present disclosure provides a lighting control system which comprises: a router installed with a Zigbee gateway, and at least one set of lighting devices; the lighting device comprises a Zigbee control module, a power supply module connected to the Zigbee control module, and a lamp connected to the power supply module; wherein the Zigbee gateway communicates signals with the Zigbee control module through the Zigbee protocol;

the Zigbee gateway converts a wireless signal received by the router for controlling the operation of the lamp into a digital signal of the Zigbee protocol, and transmits the digital signal to the Zigbee control module; and the Zigbee control module converts the digital signal transmitted by the Zigbee gateway into a control signal required to adjust the lamp, and the control signal controls an electric signal output to the lamp by the power supply module to control the operation of the lamp.

The above lighting control system provided by at least one embodiment of the present disclosure builds a control network for lighting devices with the Zigbee technology. Since Zigbee signals are superior to infrared signals in terms of transmission distance and penetrability, using Zigbee signals to build a lighting control system facilitates ad hoc networking and can realize multi-point control of lamps.

In a possible implementation, in order to realize remote control of a lighting system, the above lighting control system provided by at least one embodiment of the present disclosure further comprises a terminal; and the terminal transmits the wireless signal for adjusting the operation of the lamp to the router through wireless network.

In a possible implementation, in the above lighting control system provided by at least one embodiment of the present disclosure, the terminal comprises a selection module, a light configuration module connected to the selection module, a light effect storage module connected to the light configuration module, an invoking module connected to the selection module and the light effect storage module, and a transmitting module connected to the invoking module;

the selection module is used for a user to configure a required scenario mode or invoke a scenario mode stored by the light effect storage module;

the light configuration module configures a scenario mode according to the user's input signal and stores the configured scenario mode into the light effect storage module;

the invoking module invokes a scenario mode stored by the light effect storage module according to an instruction of the selection module and transmits the invoked scenario mode to the transmitting module;

the transmitting module generates a wireless signal corresponding to the received scenario mode, and transmits the wireless signal to the router.

In a possible implementation, in the above lighting control system provided by at least one embodiment of the present disclosure, the wireless signal transmitted by the terminal to the router is a Wifi signal.

In a possible implementation, in the above lighting control system provided by at least one embodiment of the present disclosure, the lamp in the lighting device comprises multiple lamp beads emitting monochromic light; and the power supply module comprises power supply submodules connected to the lamp beads in a one-to-one manner.

In a possible implementation, in the above lighting control system provided by at least one embodiment of the present disclosure, the light in the lighting device comprises multiple lamp beads emitting light rays with different chromatic temperatures; and the power supply module comprises power supply submodules connected to the lamp beads in a one-to-one manner.

In a possible implementation, in the above lighting control system provided by at least one embodiment of the present disclosure, the lighting device further comprises a power source converting module;

the power source converting module is connected to an external power source and is also connected to the Zigbee control module and the power supply module respectively, used to convert the voltage of the external power source into the usage voltages of the Zigbee control module and the power supply module.

In a possible implementation, in the above lighting control system provided by at least one embodiment of the present disclosure, the lighting device further comprises a detection module for detecting the brightness of the lamp;

the detection module is connected to the Zigbee control module and the lamp, and the detection module transmits the brightness information of the lamp to the Zigbee gateway through the Zigbee control module.

DETAILED DESCRIPTION

In the following, detailed description on implementations of the lighting control system provided by embodiments of the present disclosure is made in connection with the accompanying figures.

The existing LED luminaire can be controlled in a wired or wireless manner. The wireless manner is usually to adjust the operating state of the LED by a wireless remote controller. Usually, the current wireless remote control for a luminaire mainly uses infrared control. However, the transmission distance of infrared is limited, and its signal has low penetrability. The infrared only supports point-to-point transmission, and it is not easy to realize networking control.

Figure 1:
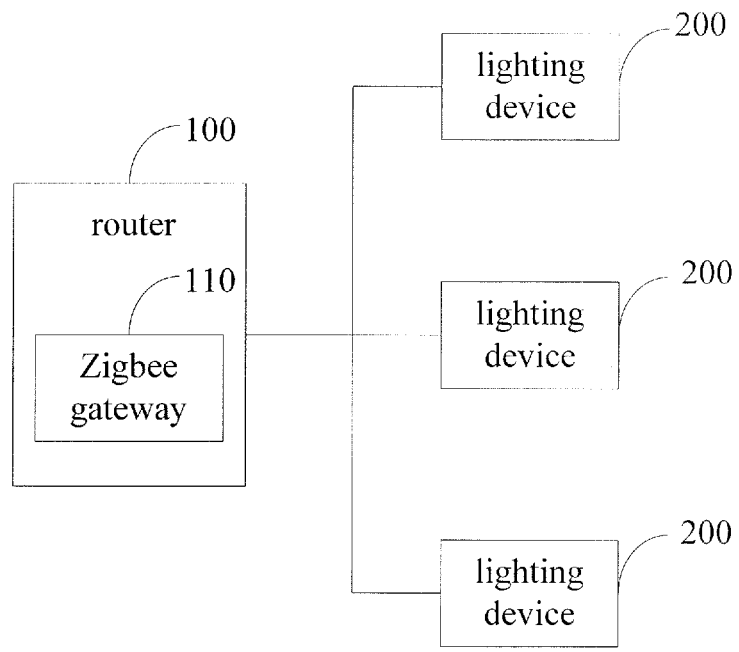
FIG. 1 is a schematic structural diagram of a lighting control system provided by an embodiment of the present disclosure.
Figure 4:
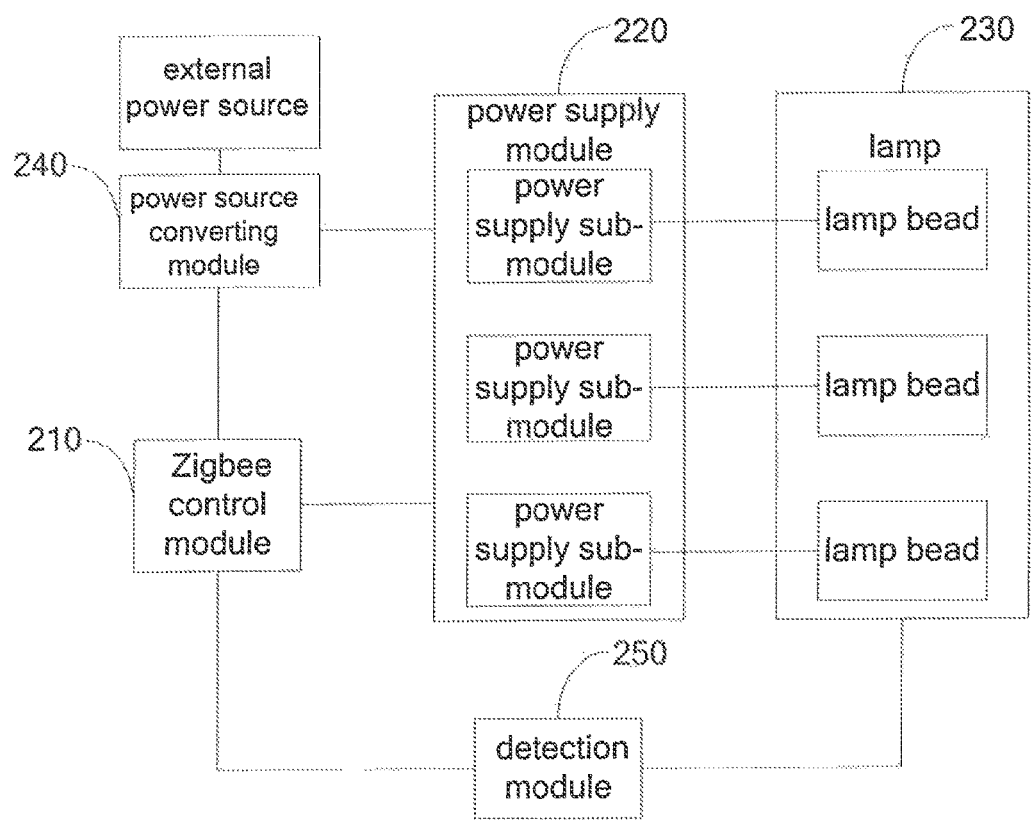
FIG. 4 is a schematic structural diagram of a lighting device in a lighting control system provided by an embodiment of the present disclosure.

FIG. 1 is a schematic structural diagram of a lighting control system provided by an embodiment of the present disclosure. As shown in FIG. 1, the light control system comprises a router 100 installed with a Zigbee gateway 110, and at least one set of lighting devices 200. As shown in FIG. 4, the lighting device 200 comprises a Zigbee control module 210, a power supply module 220 connected to the Zigbee control module 210, and a lamp 230 connected to the power supply module 220.

The Zigbee gateway 110 communicates signals with the Zigbee control module 210 through the Zigbee protocol.

The Zigbee gateway 110 converts a wireless signal received by the router 100 for controlling the operation of the lamp 230 into a digital signal of the Zigbee protocol, and transmits the digital signal to the Zigbee control module.

The Zigbee control module 210 converts the digital signal transmitted by the Zigbee gateway 110 into a control signal required to adjust the lamp 230, and the control signal controls an electric signal output to the lamp 230 by the power supply module 220 to control the operation of the lamp 230.

The above lighting control system provided by at least one embodiment of the present disclosure builds a control network for lighting devices with the Zigbee technology. Since Zigbee signals are superior to infrared signals in terms of transmission distance and penetrability, using Zigbee signals to build a lighting control system facilitates ad hoc networking and can realize multi-point control of lamp.

In an implementation, in the above lighting control system provided by an embodiment of the present disclosure, one router 100 can control one set or multiple sets of lighting devices 200 simultaneously to realize adjustment on lighting mode of one set or multiple sets of lighting devices 200.

In an implementation, the lamp 230 comprised in the lighting device 200 can be a LED lamp, and accordingly, the control signals transmitted by the Zigbee control module 210 to respective power supply modules 220 can be PWM signals.

Figure 2:
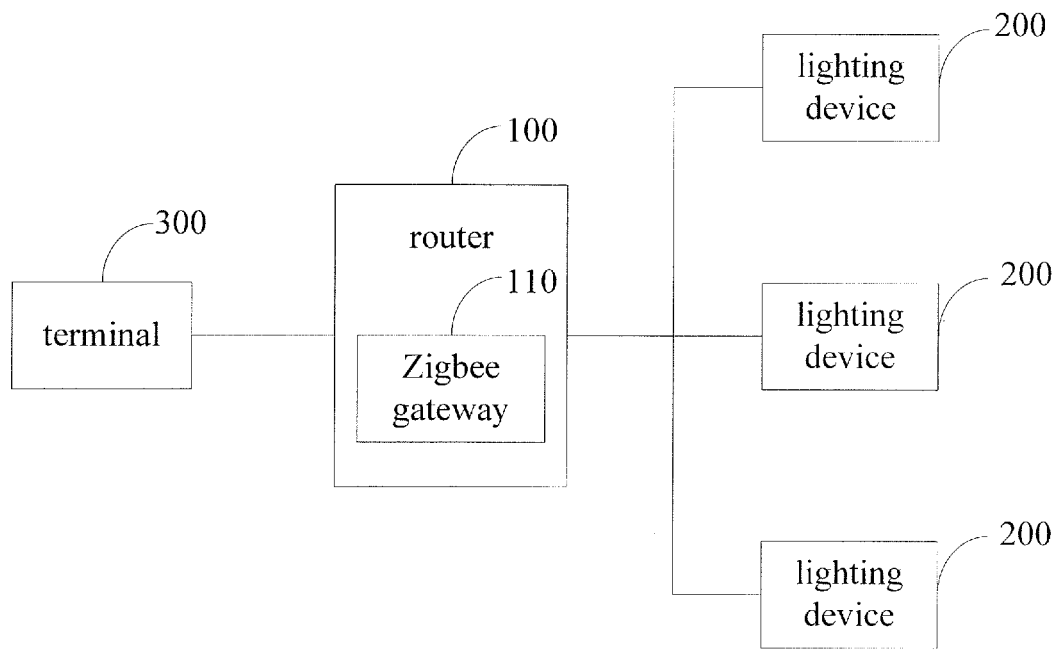
FIG. 2 is another schematic structural diagram of a lighting control system provided by an embodiment of the present disclosure.

FIG. 2 is another schematic structural diagram of a lighting control system provided by an embodiment of the present disclosure. As shown in FIG. 2, in order to realize remote control of a lighting system, the above lighting control system provided by an embodiment of the present disclosure can further comprise a terminal 300; and the terminal 300 can perform signal transmission with the router 100 through wireless network, that is, the terminal 300 transmits the wireless signal for adjusting the operation of the lamp 230 to the router 100 through wireless network.

In implementations, the wireless signal transmitted by the terminal 300 to the router 100 can adopt a Wifi signal, and can also adopt wireless signals of other protocols, which is not limited herein.

In implementations, it is possible to install a lighting control client software in the terminal 300 to realize remote adjustment and control of the brightness and ON/OFF state of the lighting device 200. For example, after a user selects to adjust the lighting device 200 through the client software, the terminal 300 generates a wireless signal transmitted based on the wifi protocol. The signal is transmitted to the router 100, then subject to protocol conversion of the Zigbee gateway 110 to be converted into a digital signal of the Zigbee protocol and transmitted to the Zigbee control module 210 of the lighting device 200. The Zigbee control module 210 interprets the received digital signal to generate a corresponding control signal. The control signal can control the duty ratio of the electric signal waveform input into the lamp 230 by the power supply module 220, to then control the brightness of the lamp 230. For example, when the duty ratio of the electric signal input into the lamp 230 by the power module 220 is higher, the emitting brightness of the lamp 230 is higher; when the duty ratio of the electric signal input into the lamp 230 by the power module 220 is lower, the emitting brightness of the lamp 230 is lower.

In implementations, when a terminal is used to control each lighting device in the lighting control system, in order to realize better lighting adjustment effect, for example, it is possible to realize various scenario application in connection with a intelligent house system, for example, in a stage mode, the lighting devices can be controlled to automatically perform color alternation and flickering to realize the effect of stage lamps.

Figure 3:
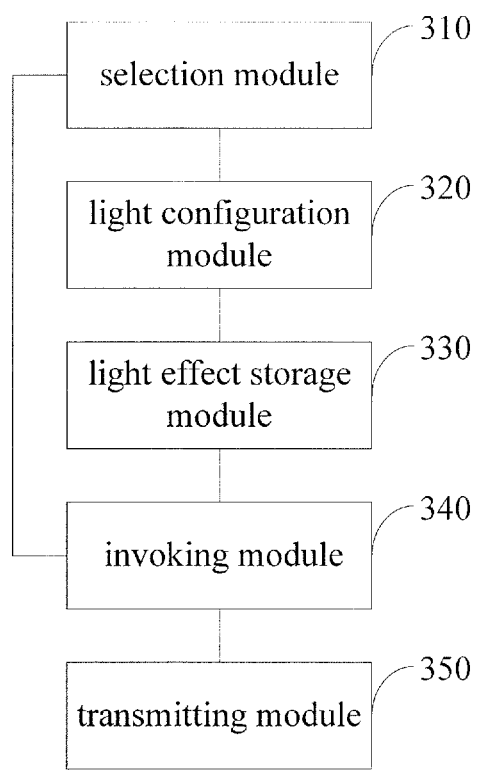
FIG. 3 is a schematic structural diagram of a terminal in a lighting control system provided by an embodiment of the present disclosure.

FIG. 3 is a schematic structural diagram of a terminal in a lighting control system provided by an embodiment of the present disclosure. As shown in FIG. 3, in the above lighting control system provided by an embodiment of the present disclosure, the terminal 300 comprises a selection module 310, a light configuration module 320 connected to the selection module 310, a light effect storage module 330 connected to the light configuration module 320, an invoking module 340 connected to the selection module 310 and the light effect storage module 330, and a transmitting module 350 connected to the invoking module 340.

The selection module 310 is used for a user to configure a required scenario mode or invoke a scenario mode stored by the light effect storage module.

The light configuration module 320 configures a scenario mode according to the user's input signal and stores the configured scenario mode into the light effect storage module 330.

The invoking module 340 invokes a scenario mode stored by the light effect storage module 330 according to an instruction of the selection module 310 and transmits the invoked scenario mode to the transmitting module 350.

The transmitting module 350 generates a wireless signal corresponding to the received scenario mode, and transmits the wireless signal to the router 100.

The selection module 310 herein can be implemented for example by a signal selection circuit, the light configuration module 320 can be implemented for example by a signal latch or a memory, and the invoking module 340 can be implemented for example by an addressing circuit plus a read/write circuit. Alternatively, the above modules can be implemented by software.

Further, in the above lighting control system provided by an embodiment of the present disclosure, the control manner of the color adjustment of the lamps in the lighting device can be realized by RGB color mixing or color mixing of warm white light elements and cold white light elements.

FIG. 4 is a schematic structural diagram of a lighting device in a lighting control system provided by an embodiment of the present disclosure. As shown in FIG. 4, the lamp 230 in the lighting device 200 can comprise multiple lamp beads; and the power supply module 220 can also comprise power supply sub-modules connected to the lamp beads in a one-to-one manner.

In one implementation, the lamp 230 in one lighting device 200 can comprise multiple lamp beads emitting monochromic light. For example, in one lighting device 200, a lamp bead emitting red light, a lamp bead emitting green light and a lamp bead emitting blue light are installed. Accordingly, the power supply module 220 can also comprise power supply sub-modules connected to the lamp beads in a one-to-one manner, that is, one lamp bead is provided with one corresponding power supply sub-module. The Zigbee control module generates different control signals respectively for the power supply sub-modules controlling different lamp beads according to the received digital signal. The lights of three colors are mixed under different brightness values to generate different chromatic temperatures, to realize the effect of general adjustment of the chromatic temperature of the lamp.

In another implementation, the lamp 230 in one lighting device 200 can comprise multiple lamp beads emitting light rays with different chromatic temperatures. For example, in one lighting device 200, a lamp bead with warm white light elements and a lamp bead with cold white light elements are installed. Accordingly, the power supply module 220 can also comprise power supply sub-modules connected to the lamp beads in a one-to-one manner, that is, the lamp bead with warm white light element is provided with a separate power supply sub-module, and the lamp bead with cold white light element is also provided with a separate power supply sub-module. The Zigbee control module generates different control signals respectively for the power supply sub-modules controlling different lamp beads according to the received digital signal. The lights with two different chromatic temperatures are mixed under different brightness values to generate different chromatic temperatures, to realize the effect of general adjustment of the chromatic temperature of the lamp.

Further, as shown in FIG. 4, the above lighting device provided by an embodiment of the present disclosure can further comprise a power source converting module 240.

The power source converting module 240 is connected to an external power source and is also connected to the Zigbee control module 210 and the power supply module 220 respectively, used to convert the voltage of the external power source into the usage voltages of the Zigbee control module 210 and the power supply module 220. In implementations, the external power source connected to the power source converting module 240 can be a household AC power source, or can also be a solar energy photoelectric conversion power source and so on, which is not limited herein.

Further, as shown in FIG. 4, the above lighting device provided by an embodiment of the present disclosure can further comprise a detection module 250 for detecting the brightness of the lamp 230.

The detection module 250 is connected to the Zigbee control module 210 and the lamp 230, and the detection module 250 transmits the brightness information of the lamp 230 to the Zigbee gateway 110 through the Zigbee control module 210 for feedback of the brightness of the lamp.

With the description of the above implementations, those skilled in the art can clearly understand that embodiments of the present disclosure can be realized completely by hardware, or can also be realized by software in combination with a necessary general hardware platform. Based on this understanding, the technical solutions of embodiments of the present disclosure can be presented by a software product. The software product can be stored in a non-volatile storage medium (for example, CD-ROM, U disk, or mobile hard disk). The non-volatile storage medium comprises several instructions to make a computing device (for example, a personal computer, a server, or a network device) perform the method described in each embodiment of the present disclosure.

Those skilled in the art can understand that the accompanying figures are only schematic figures of alternative embodiments. The modules or flows in the figures are not necessarily required to implement the present invention.

Those skilled in the art can understand that the modules in the devices of the embodiments can be located in the devices of the embodiments as described in the embodiments, or can also be located in one or more devices that are different from the embodiments by corresponding alternations. The modules in the above embodiments can be combined into one module, or can be further divided into multiple sub-modules.

The reference numerals in the embodiments of the present disclosure are only for illustration, but do not represent superiority or inferiority of the embodiments.

A lighting control system provided by an embodiment of the present disclosure comprises a router installed with a Zigbee gateway, and at least one set of lighting devices; the lighting device comprises a Zigbee control module, a power supply module and a lamp; wherein the Zigbee gateway communicates signals with the Zigbee control module through the Zigbee protocol; the Zigbee gateway converts a wireless signal received by the router for controlling the operation of the lamp into a digital signal of the Zigbee protocol and transmits the digital signal to the Zigbee control module; and the Zigbee control module converts the digital signal into a control signal required to adjust the lamp, and the control signal controls an electric signal output to the lamp by the power supply module to control the operation of the lamp. The above lighting control system provided by an embodiment of the present disclosure builds a control network for lighting devices with the Zigbee technology. Since Zigbee signals are superior to infrared signals in terms of transmission distance and penetrability, using Zigbee signals to build a lighting control system facilitates ad hoc networking and can realize multi-point control of lamps.

Obviously, those skilled in the art can make various changes and variations without departing from the spirit and scope of the present disclosure. As such, if those changes and variations of the present disclosure fall within the claims of the present disclosure, the present disclosure is also intended to incorporate those changes and variations.

The present application claims the priority of Chinese Patent Application No. 201410093874.6 filed on Mar. 13, 2014, entire content of which is incorporated as part of the present application by reference.

What is claimed is:

1. A lighting control system, comprising:
   a router installed with a Zigbee gateway, and at least one set of lighting devices;
   each of the lighting devices comprises a Zigbee control module, a power supply module connected to the Zigbee control module, and a lamp connected to the power supply module;
   the Zigbee gateway communicates signals with the Zigbee control module through the Zigbee protocol;
   the Zigbee gateway converts a wireless signal received by the router for controlling the operation of the lamp into a digital signal of the Zigbee protocol, and transmits the digital signal to the Zigbee control module; and the Zigbee control module converts the digital signal transmitted by the Zigbee gateway into a control signal required to adjust the lamp, and the control signal controls an electric signal output to the lamp by the power supply module to control the operation of the lamp, wherein the system further comprises a terminal; and the terminal transmits the wireless signal for adjusting the operation of the lamp to the router through wireless network, and wherein the terminal comprises a selection module, a light configuration module connected to the selection module, a light effect storage module connected to the light configuration module, an invoking module connected to the selection module and the light effect storage module, and a transmitting module connected to the invoking module;

the selection module is used for a user to configure a required scenario mode or invoke a scenario mode stored by the light effect storage module;

the light configuration module configures a scenario mode according to the user's input signal and stores the configured scenario mode into the light effect storage module;

the invoking module invokes a scenario mode stored by the light effect storage module according to an instruction of the selection module and transmits the invoked scenario mode to the transmitting module; and the transmitting module generates a wireless signal corresponding to the received scenario mode, and transmits the wireless signal to the router.

2. The system according to claim 1, wherein the wireless signal transmitted by the terminal to the router is a Wifi signal.

3. The system according to claim 1, wherein the lamp in the lighting device comprises multiple lamp beads emitting monochromic light; and the power supply module comprises power supply submodules connected to the lamp beads in a one-to-one manner.

4. The system according to claim 1, wherein the light in the lighting device comprises multiple lamp beads emitting light rays with different chromatic temperatures; and the power supply module comprises power supply submodules connected to the lamp beads in a one-to-one manner.

5. The system according to claim 1, wherein the lighting device further comprises a power source converting module; and the power source converting module is connected to an external power source and is also connected to the Zigbee control module and the power supply module respectively, used to convert the voltage of the external power source into the usage voltages of the Zigbee control module and the power supply module.

6. The system according to claim 1, wherein the lighting device further comprises a detection module for detecting the brightness of the lamp; and the detection module is connected to the Zigbee control module and the lamp, and the detection module transmits the brightness information of the lamp to the Zigbee gateway through the Zigbee control module.

7. The system according to claim 2, wherein the lamp in the lighting device comprises multiple lamp beads emitting monochromic light; and the power supply module comprises power supply submodules connected to the lamp beads in a one-to-one manner.

8. The system according to claim 2, wherein the lamp in the lighting device comprises multiple lamp beads emitting monochromic light; and the power supply module comprises power supply submodules connected to the lamp beads in a one-to-one manner.

9. The system according to claim 2, wherein the light in the lighting device comprises multiple lamp beads emitting light rays with different chromatic temperatures; and the power supply module comprises power supply submodules connected to the lamp beads in a one-to-one manner.

10. The system according to claim 2, wherein the light in the lighting device comprises multiple lamp beads emitting light rays with different chromatic temperatures; and the power supply module comprises power supply submodules connected to the lamp beads in a one-to-one manner.

* * * * *